United States Patent
Bubb et al.

(10) Patent No.: US 10,603,633 B2
(45) Date of Patent: Mar. 31, 2020

(54) HONEYCOMB STRUCTURE COMPRISING A CEMENT SKIN COMPOSITION WITH CRYSTALLINE INORGANIC FIBROUS MATERIAL

(71) Applicant: Corning Incorporated, Corning, NY (US)

(72) Inventors: Keith Norman Bubb, Beaver Dams, NY (US); Thomas Richard Chapman, Painted Post, NY (US); Kenneth Joseph Drury, Big Flats, NY (US); Christopher Lane Kerr, Tioga, PA (US); Mark Alan Lewis, Horseheads, NY (US); Robert John Locker, Corning, NY (US); Huthavahana Kuchibhotla Sarma, San Jose, CA (US); Todd Parrish St Clair, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 162 days.

(21) Appl. No.: 15/307,648

(22) PCT Filed: May 1, 2015

(86) PCT No.: PCT/US2015/028759
§ 371 (c)(1),
(2) Date: Oct. 28, 2016

(87) PCT Pub. No.: WO2015/168530
PCT Pub. Date: Nov. 5, 2015

(65) Prior Publication Data
US 2017/0044066 A1 Feb. 16, 2017

Related U.S. Application Data

(63) Continuation-in-part of application No. 13/770,104, filed on Feb. 19, 2013, now Pat. No. 9,139,479.
(Continued)

(51) Int. Cl.
*C04B 41/45* (2006.01)
*B01D 53/94* (2006.01)
(Continued)

(52) U.S. Cl.
CPC ......... *B01D 53/94* (2013.01); *B01D 46/2418* (2013.01); *B01D 46/2429* (2013.01);
(Continued)

(58) Field of Classification Search
CPC ......... C04B 38/0006; C04B 1/80; C04B 1/81; C04B 1/82; C04B 1/85; C04B 1/90;
(Continued)

(56) References Cited

U.S. PATENT DOCUMENTS

| 5,629,067 | A | 5/1997 | Kotani et al. |
| 7,662,458 | B2 | 2/2010 | Ninomiya et al. |

(Continued)

FOREIGN PATENT DOCUMENTS

| JP | 2008043851 A | * | 2/2008 | ............. B01D 39/14 |
| JP | 2013202532 A | | 10/2013 | |

(Continued)

OTHER PUBLICATIONS

Notification of Transmittal of The International Search Report and Written Opinion of the International Searching Authority, or the Declaration, dated May 1, 2015 pp. 1-15, International Application No. PCT/US2015/028759, European Patent Office, The Netherlands.
(Continued)

*Primary Examiner* — Tri V Nguyen

(57) ABSTRACT

Disclosed is a honeycomb support structure comprising a honeycomb body and an outer layer or skin formed of a cement that includes an inorganic filler material having a first coefficient of thermal expansion from 25 C to 600 C and a crystalline inorganic fibrous material having a second coefficient of thermal expansion from 25 C to 600 C. Skin cement composition controls level of cement liquid/colloid
(Continued)

components, for example water, colloidal silica, and methylcellulose migration into the substrate during the skin application process to form barrier to skin wetting and staining during the washcoating process.

6 Claims, 11 Drawing Sheets

Related U.S. Application Data

(60) Provisional application No. 61/987,071, filed on May 1, 2014, provisional application No. 61/602,883, filed on Feb. 24, 2012.

(51) Int. Cl.

| | | |
|---|---|---|
| *B01J 35/04* | (2006.01) | |
| *B01J 21/16* | (2006.01) | |
| *B01J 23/02* | (2006.01) | |
| *B01J 21/08* | (2006.01) | |
| *B01J 35/00* | (2006.01) | |
| *B01J 37/02* | (2006.01) | |
| *B01D 46/24* | (2006.01) | |
| *C04B 41/85* | (2006.01) | |
| *C04B 41/00* | (2006.01) | |
| *F01N 3/022* | (2006.01) | |
| *C04B 41/50* | (2006.01) | |
| *C04B 35/63* | (2006.01) | |
| *C04B 35/14* | (2006.01) | |
| *C04B 35/626* | (2006.01) | |
| *F01N 3/035* | (2006.01) | |
| *C04B 111/00* | (2006.01) | |
| *F01N 3/28* | (2006.01) | |

(52) U.S. Cl.
CPC .............. *B01J 21/08* (2013.01); *B01J 21/16* (2013.01); *B01J 23/02* (2013.01); *B01J 35/0006* (2013.01); *B01J 35/04* (2013.01); *B01J 37/0215* (2013.01); *B01J 37/0236* (2013.01); *C04B 35/14* (2013.01); *C04B 35/62665* (2013.01); *C04B 35/6316* (2013.01); *C04B 41/009* (2013.01); *C04B 41/5089* (2013.01); *C04B 41/85* (2013.01); *F01N 3/0222* (2013.01); *F01N 3/035* (2013.01); *B01D 2255/915* (2013.01); *C04B 2111/0081* (2013.01); *C04B 2111/00793* (2013.01); *C04B 2235/3206* (2013.01); *C04B 2235/3208* (2013.01); *C04B 2235/349* (2013.01); *C04B 2235/3418* (2013.01); *C04B 2235/449* (2013.01); *C04B 2235/5232* (2013.01); *F01N 3/2828* (2013.01); *F01N 2330/06* (2013.01); *Y10T 428/24149* (2015.01)

(58) Field of Classification Search
CPC ......... C04B 41/80; C04B 41/81; C04B 41/82; C04B 41/85; C04B 41/90; F01N 3/022; B01J 21/08; B01J 37/0215
USPC ........................................................ 428/116
See application file for complete search history.

(56) References Cited

U.S. PATENT DOCUMENTS

| | | |
|---|---|---|
| 7,981,496 B2 | 7/2011 | Ohno et al. |
| 8,182,603 B2 | 5/2012 | Cecce et al. |
| 8,349,124 B2 | 1/2013 | Mizuno et al. |
| 8,454,886 B2 | 6/2013 | Faber et al. |
| 8,518,857 B2 | 8/2013 | Bliss et al. |
| 8,617,659 B2 | 12/2013 | Domey et al. |
| 8,679,615 B2 | 3/2014 | Fernando et al. |
| 8,696,807 B2 | 4/2014 | Fernando et al. |
| 9,132,578 B2 | 9/2015 | Anthony et al. |
| 9,205,363 B2 | 12/2015 | Yamada et al. |
| 9,840,444 B2 | 12/2017 | Okazaki |
| 2006/0292330 A1* | 12/2006 | Ohno ................. B01D 46/2429 428/116 |
| 2008/0138567 A1* | 6/2008 | Ninomiya .......... B01D 39/2089 428/116 |
| 2009/0142499 A1* | 6/2009 | Cecce ................... C04B 26/285 427/372.2 |
| 2009/0143221 A1 | 6/2009 | Ogunwumi et al. |
| 2009/0295044 A1 | 12/2009 | Amsden et al. |
| 2012/0301664 A1* | 11/2012 | Chapman .............. C04B 41/009 428/116 |
| 2013/0224430 A1 | 8/2013 | Chapman et al. |
| 2014/0127412 A1 | 5/2014 | Vosejpka et al. |
| 2014/0319742 A1* | 10/2014 | Pyzik ................... C04B 28/001 264/630 |

FOREIGN PATENT DOCUMENTS

| | | |
|---|---|---|
| WO | 2012074977 A1 | 6/2012 |
| WO | 201315932 | 1/2013 |
| WO | 2013048850 | 4/2013 |
| WO | 2014036114 | 3/2014 |

OTHER PUBLICATIONS

English Translation of JP2016565429 Office Action dated Aug. 28, 2018, Japan Patent Office, 8 Pgs.

\* cited by examiner

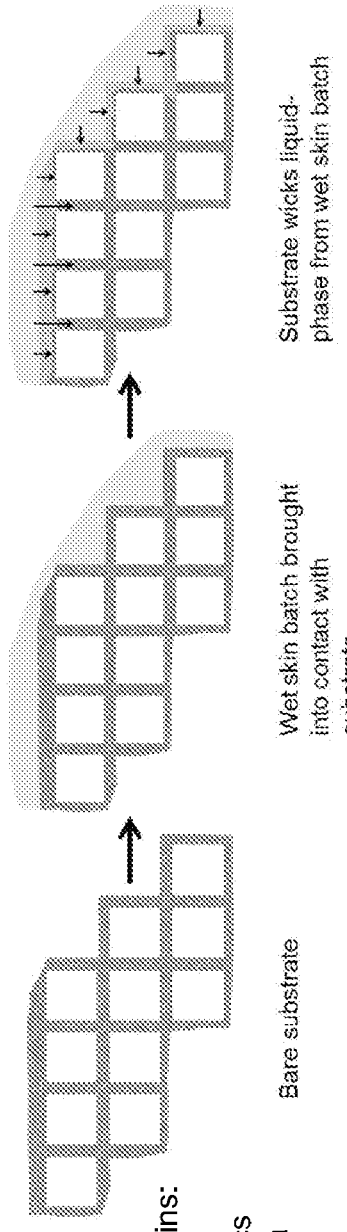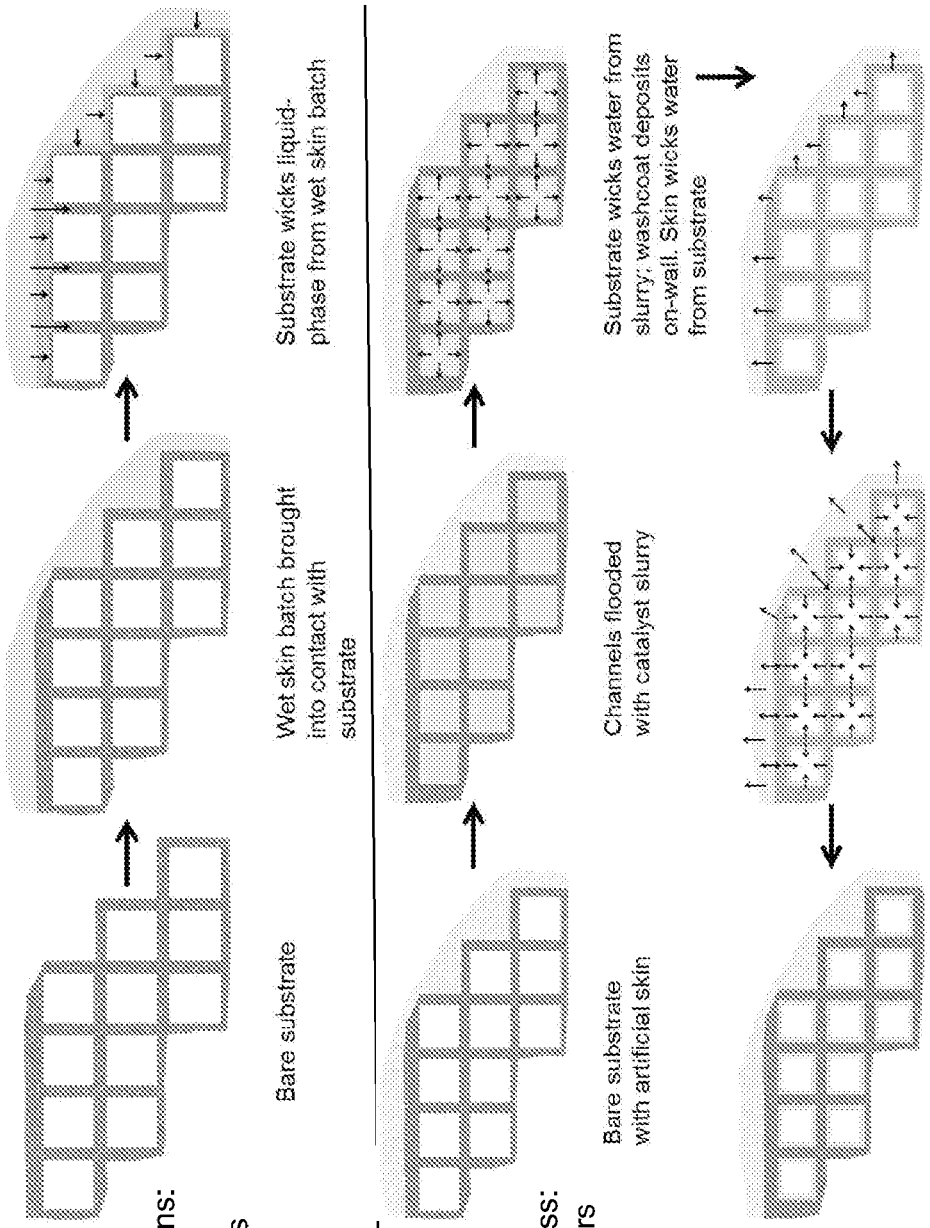

Batches 1-4 types – high colloidal silica migration

Batch 8, very low colloidal silica migration

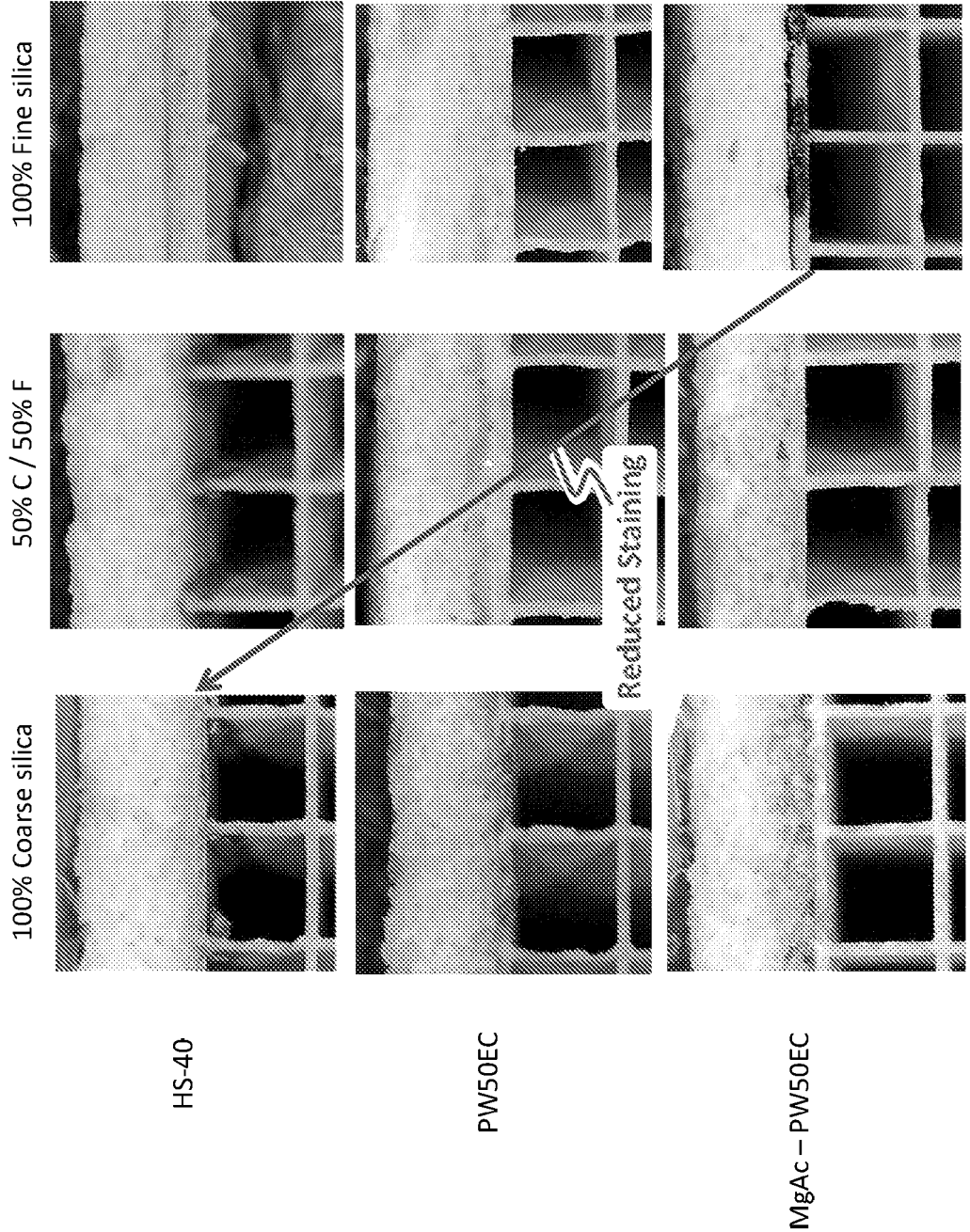
FIG. 14  DOE with Fused silica permeability (coarse/fine ratio) and colloidal silica type (HS-40, PW50EC, MgAc gelled PW50EC)

HONEYCOMB STRUCTURE COMPRISING A CEMENT SKIN COMPOSITION WITH CRYSTALLINE INORGANIC FIBROUS MATERIAL

CROSS REFERENCE TO RELATED APPLICATION

This application is a national stage entry under 35 U.S.C. § 371 of International Application No. PCT/US2015/028759 filed on May 1, 2015, which claims the benefit of priority under 35 U.S.C. § 119 of U.S. Provisional Application No. 61/987,071, filed on May 1, 2014, and this application is a Continuation-in-Part of U.S. patent application Ser. No. 13/770,104, filed on Feb. 19, 2013, which claims priority from and the benefit of U.S. Provisional Application Ser. No. 61/602,883, filed on Feb. 24, 2012, all of which are hereby incorporated by reference for all purposes as if fully set forth herein.

BACKGROUND

Field

The present invention relates generally to honeycomb structures, and particularly to ceramic honeycomb particulate filters and substrates comprising an outer skin having a crystalline inorganic fibrous material.

Technical Background

Much interest has been directed towards the diesel engine due to its efficiency, durability and economical aspects. However, diesel emissions have come under attack both in the United States and Europe for their harmful effects on the environment and on humans. As such, stricter environmental regulations will require diesel engines to be held to the same standards as gasoline engines. Therefore, diesel engine manufacturers and emission-control companies are working to achieve a faster, cleaner diesel engine that meets the most stringent of requirements under all operating conditions with minimal cost to the consumer.

Diesel particulate filters and substrates with large diameters cannot currently be manufactured to the tight dimensional requirements set by original equipment manufacturers (OEMs) and the supply chain due to unpredictable drying and firing shrinkage. Consequently, a coldset ceramic cement has been used to form the exterior skin of the cordierite monolith. The coldset ceramic cement is mixed and applied to a fired, contoured substrate and the wet skin is afterward allowed to dry either under ambient conditions or by convective or microwave drying at elevated temperatures. The dried part is then ready to receive a catalyst coating and any further downstream processing required.

SUMMARY

In one embodiment, a honeycomb body includes a plurality of cells extending axially between first and second opposing end faces of the honeycomb body, the cells including intersecting porous walls. A cement mixture is deposited over a periphery of the honeycomb body, the cement mixture including an inorganic filler material having a first coefficient of thermal expansion from 25° C. to 600° C. and a crystalline inorganic fibrous material having a second coefficient of thermal expansion from 25° C. to 600° C. The inorganic filler material comprises at least 10% of the total weight of the inorganic solid components of the cement mixture and the crystalline inorganic fibrous material comprises less than 25% of the total weight of the inorganic solid components of the cement mixture. The first coefficient of thermal expansion is less than 50% of the second coefficient of thermal expansion.

In another embodiment, a method of making a honeycomb structure is described, which includes extruding a honeycomb body, the honeycomb body including a plurality of cells extending axially between first and second opposing end faces of the honeycomb body, the cells including intersecting porous walls. The method also includes shaping the honeycomb body, thereby exposing portions of the porous walls around a periphery of the honeycomb body. In addition, the method includes coating the periphery of the shaped honeycomb body with a cement mixture. The method further includes drying the cement mixture. The cement mixture includes an inorganic filler material having a first coefficient of thermal expansion from 25° C. to 600° C. and a crystalline inorganic fibrous material having a second coefficient of thermal expansion from 25° C. to 600° C. The inorganic filler material comprises at least 10% of the total weight of the inorganic solid components of the cement mixture and the crystalline inorganic fibrous material comprises less than 25% of the total weight of the inorganic solid components of the cement mixture. The first coefficient of thermal expansion is less than 50% of the second coefficient of thermal expansion.

In another embodiment, a cement mixture for application to a ceramic substrate includes an inorganic filler material having a first coefficient of thermal expansion from 25° C. to 600° C. and a crystalline inorganic fibrous material having a second coefficient of thermal expansion from 25° C. to 600° C. The inorganic filler material comprises at least 10% of the total weight of the inorganic solid components of the cement mixture and the crystalline inorganic fibrous material comprises less than 25% of the total weight of the inorganic solid components of the cement mixture. The first coefficient of thermal expansion is less than 50% of the second coefficient of thermal expansion.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 5A shows the dynamics of interaction of the skin with the substrate during the skin application process and FIG. 5B shows interaction of washcoat slurry with the substrate and skin during the washcoating process. The interaction of skin cement and the contoured substrate can result in generating a skin, skin/substrate, or substrate interface microstructure that can impact skin wetting and staining during washcoating.

FIG. 10A is an end view and FIG. 10B is a cross section through the skinned substrate.

FIG. 14 shows experimental results for bleedthrough testing of varied coarse to fine fused silica ratios and varied colloidal silica systems including a gelled system in the cement mixture batches. Overall bleedthrough is improved with increased fused silica permeability and lower liquid/colloid viscosity. This results in higher levels of liquid/colloid migration during skinning and subsequent lower bleedthrough during washcoating.

DETAILED DESCRIPTION

Figure 1:
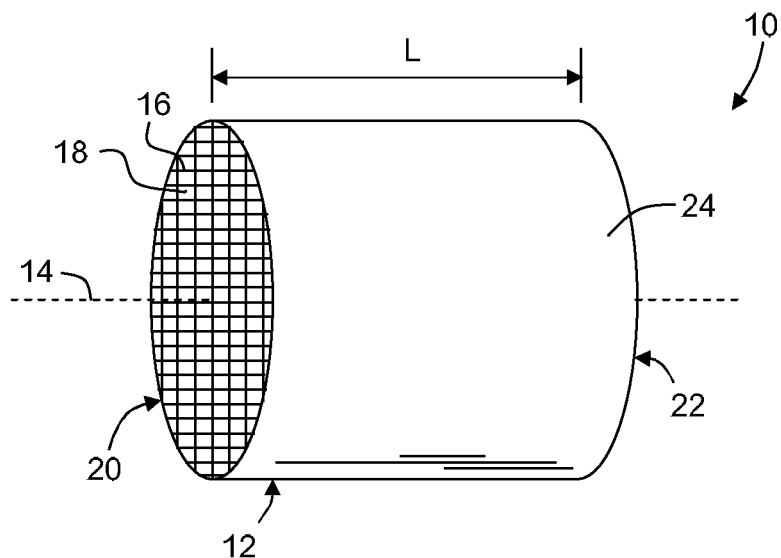
FIG. 1 is a perspective view of a honeycomb structure according an embodiment disclosed herein.

Reference will now be made in detail to embodiments of the invention, examples of which are illustrated in the accompanying drawings. Whenever possible, the same reference numeral will be used throughout the drawings to refer to the same or like parts.

As used herein, a green material is an unfired material comprising a mixture of inorganic and/or organic materials. The green material may include various inorganic filler materials, inorganic and/or organic binder materials, and liquid vehicle. The green material may be dried to remove fluid content (e.g. water). Drying is often accomplished by allowing a part to sit exposed to the ambient atmosphere overnight, however, hot air, forced air, microwave or infrared radiation may be used to augment drying.

As used herein, calcination refers to heating of a green material to a temperature less than 1000° C. for a period sufficient to burn out organic materials contained within the material, for example, 600° C. for about 3 hours.

As used herein, a "super addition" refers to a weight percent of a component, such as, for example, an organic binder, liquid vehicle, additive or pore former, based upon and relative to 100 weight percent of the inorganic components of the mixture.

Figure 2:
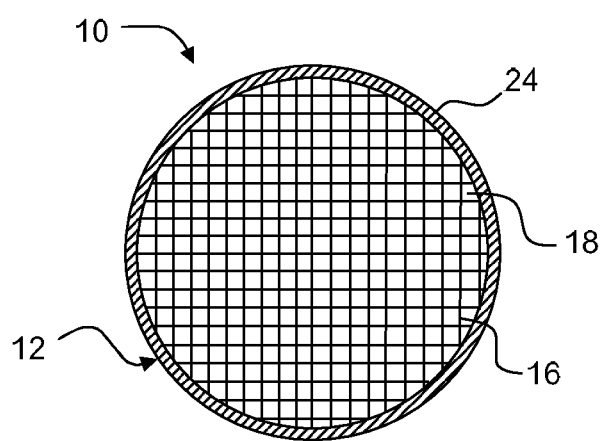
FIG. 2 is an end view of the honeycomb body of FIG. 1.

Shown in FIGS. 1 and 2 is an exemplary honeycomb structure 10 according to one embodiment comprising honeycomb body 12. Honeycomb body 12 has a longitudinal axis 14 and a length L, and comprises a plurality of intersecting porous walls 16 that form mutually adjoining cells or channels 18 extending axially between opposing end faces 20, 22. Cell density can be between 100 and 900 cells per square inch. Typical cell wall thicknesses can range from about 0.025 mm to about 1.5 mm. As used herein, the term "honeycomb" is intended to include a generally honeycomb structure but is not strictly limited to a square structure. For example, hexagonal, octagonal, triangular, rectangular or any other suitable shape may be used. Typical pore sizes contained within the porous walls can be from 0.1 μm to about 100 μm, with cell wall porosity between about 15% and 75%, preferably between about 25% and 50%.

Honeycomb body 12 may be formed from a ceramic material, such as cordierite ($2MgO-2Al_2O_3-5SiO_2$). However, limited substitution of other constituents such as Fe (iron), Co (cobalt), Ni (nickel) and Mn (manganese) for Mg (magnesium), Ga (gallium) for Al (aluminum) and Ge (germanium) for silicon is acceptable. Also, the cordierite phase may include alkali metals, alkaline earth metals or rare earth metals. Honeycomb body 12 may in certain cases be made of other ceramic materials, such as silicon carbide, aluminum titanate gamma alumina and/or mullite, or combinations thereof.

The honeycomb body can be formed according to any conventional process suitable for forming honeycomb monolithic bodies. For example, a plasticized ceramic forming batch composition can be shaped into a green body by any known conventional ceramic forming process, such as extrusion, injection molding, slip casting, centrifugal casting, pressure casting, dry pressing and the like. Typically, honeycomb structures are formed by an extrusion process where a ceramic material is extruded into a green form before the green form is fired to form the final ceramic structure. In an exemplary embodiment, the extrusion can be performed using a hydraulic ram extrusion press, a two stage de-airing single auger extruder or a twin screw mixer with a die assembly attached to the discharge end. The extruded material can be cut to create honeycomb structures such as filter bodies shaped and sized to meet the needs of engine manufacturers. These extruded green bodies can be any size or shape.

Generally, as a ceramic honeycomb structure is extruded, a solid external surface is provided along the length of the structure. Under certain circumstances, however, it may become necessary to remove the external surface. For example, a green extruded honeycomb structure may be shaped to a desired shape and size by removing the extruded external surface. Alternatively, the green honeycomb structure may be fired and then ground to the desired shape and size by removing the external extruded surface and any portion of the porous wall structure necessary to attain the desired shape and size. Shaping can be accomplished by any means known in the art, including cutting, sanding or grinding away the outer extruded surface of the honeycomb structure to achieve the desired shape and size. Once the desired shape and size has been attained, a cement material can be applied to an outer periphery of the sized body to form a new external surface, or skin, on the body. Typically, the ends of the honeycomb body are not covered with the cement, although certain passages may be plugged if desired. Once the cement composition has been applied to the honeycomb structure, the cement composition can be dried and/or calcined. In some embodiments, the honeycomb body over which the cement is applied comprises fired ceramic material. In other embodiments, the honeycomb body comprises a green body or a calcined body. In some cases, final firing of the calcined honeycomb structure can take place during the catalyzation process.

Various methods may be employed to apply a layer of cement to honeycomb body 12. For example, a dispensing device (not shown) can be used to apply an appropriate amount of cement mixture to the external surface of the honeycomb body 12. Methods of applying a skin material (e.g. cement) are well known in the art and not discussed further herein. For example, U.S. Pat. No. 8,617,659, issued Dec. 31, 2013, and U.S. patent application Ser. No. 13/463,125, filed May 3, 2012, the contents of which are incorporated herein by reference in their entirety, describe various methods of applying a cement skin to a honeycomb body.

Accordingly, honeycomb structure 10 further comprises outer wall 24 deposited over peripheral surfaces of honeycomb body 12. Outer wall 24 (hereinafter skin 24) is a cement comprising an inorganic filler material having a first coefficient of thermal expansion from 25° C. to 600° C. and a crystalline inorganic fibrous material having a second coefficient of thermal expansion from 25° C. to 600° C.

In exemplary embodiments, the inorganic filler material comprises at least 10% of the total weight of the inorganic solid components of the cement mixture and the crystalline inorganic fibrous material comprises less than 25% of the total weight of the inorganic solid components of the cement mixture. In exemplary embodiments, the first coefficient of thermal expansion is less than 50% of the second coefficient of thermal expansion.

For example, the inorganic filler material can comprise from 20% to 80%, such as from 25% to 75%, and further such as from 30% to 70%, and yet further such as from 35% to 65%, including at least 50%, at least 60%, or at least 70% of the total weight of the inorganic solids components of the cement mixture. The crystalline inorganic fibrous material can comprise from 3% to 20%, such as from 5% to 15%, and further such as from 8% to 12%, including less than 10%, less than 15%, or less than 20% of the total weight of the inorganic solids components of the cement mixture.

The first coefficient of thermal expansion, can, in certain exemplary embodiments range from $0.5 \times 10^{-7}/°$ C. to $20 \times 10^{-7}/°$ C., such as from $1.0 \times 10^{-7}/°$ C. to $10 \times 10^{-7}/°$ C. and further such as from $2.0 \times 10^{-7}/°$ C. to $5 \times 10^{-7}/°$ C., including less than $7 \times 10^{-7}/°$ C., and including about $2.5 \times 10^{7}/°$ C. The second coefficient of thermal expansion can, in certain exemplary embodiments, range from $10 \times 10^{-7}/°$ C. to $100 \times 10^{-7}/°$ C., such as from $20 \times 10^{-7}/°$ C. to $90 \times 10^{-7}/°$ C., and further such as from $30 \times 10^{-7}/°$ C. to $80 \times 10^{-7}/°$ C., including at least $50 \times 10^{-7}/°$ C., and including about $65 \times 10^{-7}/°$ C. The first coefficient of thermal expansion can, in certain exemplary embodiments, be less than $5 \times 10^{-7}/°$ C. while the second coefficient of thermal expansion can be greater than $30 \times 10^{-7}/°$ C. The first coefficient of thermal expansion can, in certain exemplary embodiments, be less than 25% of the second coefficient of thermal expansion, such as less than 20% of the second coefficient of thermal expansion, and further such as less than 15% of the second coefficient of thermal expansion, and yet further such as less than 10% of the second coefficient of thermal expansion, and still yet further such as less than 5% of the second coefficient of thermal expansion, such as from 1% to 20% of the second coefficient of thermal expansion, and further such as from 2% to 10% of the second coefficient of thermal expansion.

In certain exemplary embodiments, at least 50% by weight of the crystalline inorganic fibrous material has an aspect ratio (longest dimension divided by shortest dimension) of from 3:1 to 10:1, such as from 4:1 to 8:1. In certain exemplary embodiments, less than 10% by weight of the crystalline inorganic fibrous material has an aspect ratio of less than 3:1. In certain exemplary embodiments, less than 5% by weight of the crystalline inorganic fibrous material has an aspect ratio of less than 3:1. In certain exemplary embodiments, the average aspect ratio of the crystalline inorganic fibrous material is from 3:1 to 10:1, such as from 4:1 to 8:1, including about 5:1. All aspect ratio measurements herein are made using scanning electron microscopy (SEM) according to methods known to those skilled in the art, unless otherwise indicated.

In certain exemplary embodiments, the crystalline inorganic fibrous material has an average diameter of from 2 to 80 microns, such as from 5 to 50 microns, and further such as from 10 to 30 microns. The crystalline inorganic fibrous material can, in certain exemplary embodiments, have an average length of from 10 to 500 microns, such as from 50 to 400 microns, and further such as from 100 to 300 microns.

In certain exemplary embodiments, the crystalline inorganic fibrous material can comprise a finer fibrous material having an average diameter of from 2 to 10 microns and an average length of from 10 to 50 microns. The crystalline inorganic fibrous material may also comprise a relatively coarser fibrous material having an average diameter of from 20 to 60 microns and an average length of from 100 to 300 microns. The crystalline inorganic fibrous material may also comprise a fibrous material of intermediate coarseness, having an average diameter of from 10 to 20 microns and an average length of from 50 to 100 microns.

The crystalline inorganic fibrous material can, in certain exemplary embodiments, be present in the cement mixture in a single distribution (e.g., of only one of a finer fibrous material, coarser fibrous material, and fibrous material of intermediate coarseness), a bi-modal distribution (e.g., of two of a finer fibrous material, coarser fibrous material, and fibrous material of intermediate coarseness), or a tri-modal distribution (e.g., of three of a finer fibrous material, coarser fibrous material, and fibrous material of intermediate coarseness).

Applicants have surprisingly found that a finer fibrous material correlates to a lower amount of said fibrous material being present in certain exemplary cement mixtures having similar characteristics with respect to at least one property. Accordingly, one set of exemplary embodiments includes a cement mixture comprising a crystalline inorganic fibrous material, which comprises from 3% to 10% of the total weight of the inorganic solid components of the cement mixture, wherein the crystalline inorganic fibrous material has an average diameter of from 2 to 10 microns and an average length of from 10 to 50 microns. Exemplary embodiments also include those having a cement mixture comprising a crystalline inorganic fibrous material, which comprises from 5% to 15% of the total weight of the inorganic solid components of the cement mixture, wherein the crystalline inorganic fibrous material has an average diameter of from 10 to 20 microns and an average length of from 50 to 100 microns. Exemplary embodiments also include those having a cement mixture comprising a crystalline inorganic fibrous material, which comprises from 10% to 20% of the total weight of the inorganic solid components of the cement mixture, wherein the crystalline inorganic fibrous material has an average diameter of from 20 to 60 microns and an average length of from 100 to 300 microns.

In certain exemplary embodiments, less than 5%, such as less than 2%, and further such as less than 1% by weight of the crystalline inorganic fibrous material has a diameter of greater than 250 microns. In certain exemplary embodiments, the crystalline inorganic fibrous material is essentially free of material having a diameter of greater than 250 microns.

In certain exemplary embodiments, less than 5%, such as less than 2%, and further such as less than 1% by weight of the crystalline inorganic fibrous material has a diameter of greater than 200 microns. In certain exemplary embodiments, the crystalline inorganic fibrous material is essentially free of material having a diameter of greater than 200 microns.

In certain exemplary embodiments, less than 5%, such as less than 2%, and further such as less than 1% by weight of the crystalline inorganic fibrous material has a diameter of greater than 150 microns. In certain exemplary embodiments, the crystalline inorganic fibrous material is essentially free of material having a diameter of greater than 150 microns.

In certain exemplary embodiments, less than 5%, such as less than 2%, and further such as less than 1% by weight of the crystalline inorganic fibrous material has a diameter of greater than 100 microns. In certain exemplary embodiments, the crystalline inorganic fibrous material is essentially free of material having a diameter of greater than 100 microns.

In certain exemplary embodiments, less than 5%, such as less than 2%, and further such as less than 1% by weight of the crystalline inorganic fibrous material has a diameter of greater than 50 microns. In certain exemplary embodiments, the crystalline inorganic fibrous material is essentially free of material having a diameter of greater than 50 microns.

In certain exemplary embodiments, the crystalline inorganic fibrous material consists essentially of inorganic fibers having an aspect ratio of at least 2:1. In certain exemplary embodiments, the crystalline inorganic fibrous material contains less than 5%, such as less than 2%, and further such as less than 1% by weight of shot or filler material. In certain exemplary embodiments, the crystalline inorganic fibrous material is essentially free of shot or filler material.

In certain exemplary embodiments, at least 95%, such as at least 98%, and further such as at least 99% by weight of the crystalline inorganic fibrous material has an aspect ratio of at least 2:1. In certain exemplary embodiments, substantially all of the crystalline inorganic fibrous material has an aspect ratio of at least 2:1.

Figure 3:
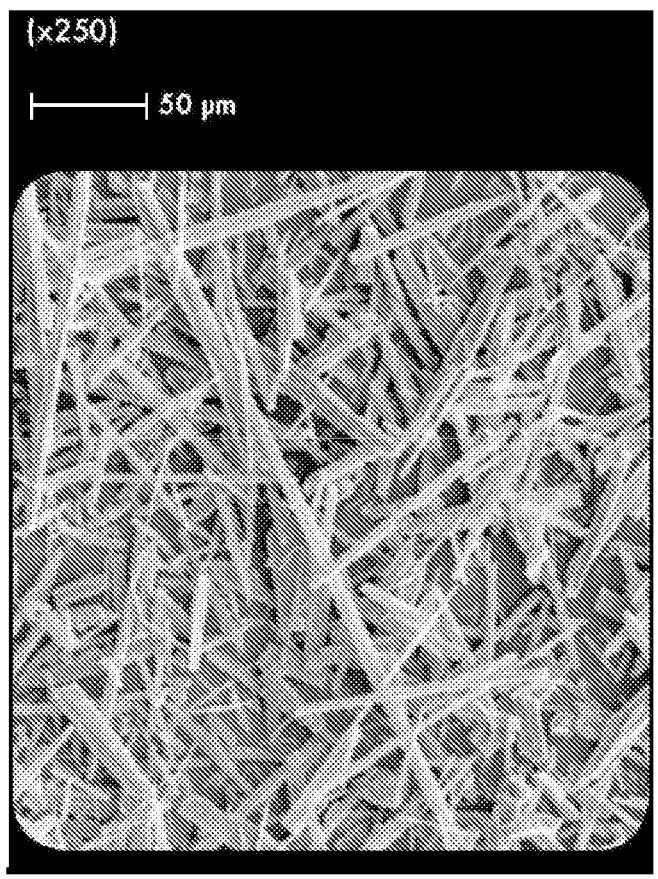
FIG. 3 is an SEM image of a crystalline inorganic fibrous material (wollastonite) that can be used in embodiments disclosed herein.

In certain exemplary embodiments, the crystalline inorganic fibrous material comprises a naturally occurring crystalline inorganic fibrous material. In certain exemplary embodiments, the crystalline inorganic fibrous material comprises an alkaline earth silicate, such as a naturally occurring alkaline earth silicate. An example of a suitable alkaline earth silicate is wollastonite ($CaSiO_3$), such as that available under the trade name Ultrafibe II, available from NYCO Minerals Incorporated, Willsboro, N.Y., USA. An SEM image of wollastonite, showing its fibrous nature, is shown in FIG. 3.

In certain exemplary embodiments, the inorganic filler material comprises at least one of ground cordierite and fused silica glass powder.

In certain exemplary embodiments, the inorganic filler material comprises cordierite, such as ground cordierite.

In certain exemplary embodiments, the inorganic filler material comprises glass powder, such as fused silica glass powder.

The glass powder filler material can have a median particle size (D50) between 10 and 20 µm, with, for example, a minimum particle size between 7 µm and 75 µm and a maximum particle size between 50 µm and 70 µm. Particle size was determined as a mass-based equivalent spherical diameter. The glass powder filler material may comprise, for example, from 60% to 80% by weight of the total inorganic components of the cement. Suitable silica powder filler materials are available, for example, under the trade name Teco-Sil, available from CE Minerals of Tennessee Electro Minerals Incorporated, Tennessee, USA. All particle size measurements herein were made with a Microtrac Inc. particle size analyzer, unless otherwise indicated.

In another embodiment, skin 24 of honeycomb structure 10 may comprise an amorphous glass-based cement, the cement formed from a composition comprising a first (fine) glass powder as a low thermal expansion filler material, a second (coarse) glass powder as a low thermal expansion filler material, a crystalline inorganic fibrous material, a binder and a solvent or vehicle for carrying the solid constituents of the glass-based cement. In certain exemplary embodiments, the glasses of both the first glass powder filler material and the second glass powder filler material are amorphous fused silica having particle sizes greater than about 1 micron. The distribution of glass powder filler material particle size may be multimodal in that a distribution of the glass powder filler material with particle sizes greater than about 1 micron exhibits multiple modes (local maximums) of particle sizes. In one embodiment, the amorphous glass-based cement comprises a bimodal particle size distribution of amorphous glass particles with a particle size greater than about 1 micron. The glass based cement may include a first glass powder filler material wherein a median (D50) particle size of the first glass powder filler material can be in a range from about 10 microns to about 50 microns, from about 15 microns to about 50 microns, from about 20 microns to about 45 microns or from about 30 microns to about 45 microns, with a D10 in a range from about 1 micron to about 10 microns and D90 in a range from about 25 microns to about 125 microns. A median (D50) particle size of the second glass powder filler material can be in a range from about 150 microns to about 300 microns, in a range from about 150 microns to about 250 microns, in a range from about 170 microns to about 230 microns, in a range from about 180 microns to about 220 microns, with D10 in a range from about 100 microns to about 150 microns, and D90 in a range from about 250 microns to about 350 microns. Particle sizes are determined as a mass-based equivalent spherical diameter. As used herein, the term D50 represents the median of the distribution of particle sizes, D10 represents the particle size in microns for which 10% of the distribution are smaller than the particle size, and D90 represents the particle size in microns for which 90% of the distribution are smaller than the particle size. All particle size measurements herein are made with a Microtrac Inc. particle size analyzer, unless otherwise indicated The glass based cement may contain, for example, an amount of the first glass powder filler material in a range from about 20% to about 60% by weight of the total weight of the inorganic solid components of the cement, in a range from about 25% to about 50% by weight, in a range from about 25% to about 40% by weight, or in a range from about 25% to about 35% by weight. The glass based cement may contain, for example, an amount of the second glass powder filler material in a range from about 10% to about 40% by weight of the total weight of the inorganic solid components of the cement, in a range from about 15% to about 40% by weight, in a range from about 20% to about 35% by weight.

In one embodiment, D50 of the first glass powder filler material may be in a range from about 34 microns to about 40 microns, and a median particle size of the second glass powder filler material is in a range from about 190 microns to about 280 microns. In one example, the first glass powder filler material has a D10 of about 6.0 microns, a D50 of about 34.9 microns and a D90 of about 99 microns. In another example, the first glass powder filler material has a D10 of about 6.7 microns, a D50 of about 39.8 microns, and a D90 of about 110.9 microns. In still another example, the first glass powder has a D10 of about 2.7 microns, a D50 of about 13.8 microns and a D90 of about 37.8 microns, and is yet another example, the first glass powder filler material has a D10 of about 2.8 microns, a D50 of about 17.2 microns and a D90 of about 47.9 microns.

The ratio of the second glass powder filler material to the first glass powder filler material may be in a range from about 1:4 to about 1:1, such as about 1:3.5 to about 1:1, from about 1:3 to about 1:1, from about 1:2.5 to about 1:1, from about 1.2 to about 1:1 or from about 1:1.5 to about 1:1. In one exemplary embodiment, the ratio of the second glass powder filler material to the first glass powder filler material is about 1:1.

To provide the cement compositions of the present disclosure, the inorganic powders comprising any of the above inorganic powders and any optional inorganic additive components can be mixed together with a suitable organic and/or inorganic binder material. The organic binder material may comprise one or more organic materials, such as a cellulose ether, methylcellulose, ethylcellulose, polyvinyl alcohol, polyethylene oxide and the like, or in some embodiments a gum-like material such as Actigum®, xanthan gum or latex. For example, A4 Methocel® is a suitable organic binder. Methocel A4® is a water-soluble methyl cellulose polymer binder available from Dow Chemical®. The organic binder material may, for example, be present in the cement composition in an amount of from 0.1% to 10% by weight, such as from 0.2% to 5%, and further such as from 0.5% to 2%.

A suitable inorganic binder may comprise colloidal silica or alumina comprising nanometer-scale silica or alumina particles suspended in a suitable liquid, such as water. The inorganic binder material may, for example, be present in the cement composition in an amount less than about of from 2% to 35% of the total weight of inorganic solids present in the cement, and in some embodiments inorganic binders are present in an amount of from 5% to 30%, and in certain other embodiments in an amount of from 10% to 25%. A suitable colloidal silica binder material is Ludox HS-40 produced by W.R. Grace. Typical colloidal binder materials may comprise approximately 40% by weight solid material as a suspension in a deionized water vehicle.

Typically, the preferred liquid vehicle or solvent for providing a flowable or paste-like consistency has included water, such as deionized (DI) water, although other materials may be used. The liquid vehicle content may be present as a super addition in an amount equal to or less than about 30% of the total weight of the inorganic components of the cement mixture, such as a range of from about 10% to about 25% of the total weight of the inorganic components of the cement mixture. However, the liquid vehicle is typically adjusted to obtain a viscosity suitable to make the cement easy to apply.

In some embodiments, the cement may optionally further contain organic modifiers, such as adhesion promoters for enhancing adhesion between the cement and the honeycomb body. For example, Michem 4983 and hydrated magnesium aluminum silicate, for example Veegum Pro®, have been found suitable for this purpose.

In certain exemplary embodiments, the cement mixture sets at a temperature of less than 1000° C., such as a temperature of less than 800° C., and further such as a temperature of less than 600° C., and yet further such as a temperature of less than 400° C., and still yet further such as a temperature of less than 200° C. In certain exemplary embodiments, the cement mixture is capable of setting at room temperature (i.e., at about 25° C.).

Table 1 below sets forth examples of ten different batches of different cement mixtures (excluding water). Batches 2-4, 7, 9, and 10 are according to exemplary embodiments described herein, each cement mixture containing: (i) an amorphous fused silica filler material with a particle size greater than 1 micron and a coefficient of thermal expansion from 25° C. to 600° C. of less than $5 \times 10^{-7}/°$ C. (coarse and fine, for example, in ratio from 1:1 to 4:1); (ii) an optional inorganic thickener such as a hydrated magnesium aluminum silicate for example Veegum Pro® (Batches 7, 9, and 10); and (iii) a crystalline inorganic fibrous material (wollastonite) with an average aspect ratio of from 4:1 to 8:1 and a coefficient of thermal expansion of greater than $50 \times 10^{-7}/°$ C.; where the weight percent for the first silica powder filler material and the crystalline inorganic fibrous material are expressed as a percent of the total inorganic components of the cement.

TABLE 1

| Component | Batch 1 wt % | Batch 2 wt % | Batch 3 wt % | Batch 4 wt % | Batch 5 wt % |
|---|---|---|---|---|---|
| Fused silica (C-E Minerals −200 F.) | 38.1 | 36.3 | 33.2 | 30.5 | 20.8 |

TABLE 1-continued

| Component | Batch 1 | Batch 2 | Batch 3 | Batch 4 | Batch 5 |
|---|---|---|---|---|---|
| Fused silica (C-E Minerals 80X105) | 38.1 | 36.3 | 33.2 | 30.5 | 48.6 |
| Wollastonite (NYCO Ultrafibe II) | 0.0 | 3.6 | 9.9 | 15.2 | 6.9 |
| Methylcellulose (Dow A4M) | 0.8 | 0.8 | 0.8 | 0.8 | 0.8 |
| Colloidal silica (Grace Ludox HS-40) | 23 | 22.9 | 22.9 | 23 | |
| Colloidal silica (Grace Ludox PW-50EC) | | | | | 22.9 |
| Magnesium aluminum silicate clay (R T Vanderbilt Veegum Pro) | | | | | |
| 11.6% magnesium acetate tetrahydrate solution | | | | | |
| Colloidal silica and Methylcellulose migration | High | High | High | High | Low |
| Degree of skin staining after washcoat | Very Low | Very Low | Very Low | Very Low | Medium |

| Component | Batch 6 wt % | Batch 7 wt % | Batch 8 wt % | Batch 9 wt % | Batch 10 wt % |
|---|---|---|---|---|---|
| Fused silica (C-E Minerals −200 F.) | 19.7 | 34.9 | 20.5 | 20.9 | 34.9 |
| Fused silica (C-E Minerals 80X105) | 45.9 | 34.9 | 47.9 | 48.9 | 34.9 |
| Wollastonite (NYCO Ultrafibe II) | 6.6 | 7.0 | 6.8 | 6.9 | 6.9 |
| Methylcellulose (Dow A4M) | 0.7 | 0.8 | 0.8 | 0.8 | 0.8 |
| Colloidal silica (Grace Ludox HS-40) | 20.5 | 21.8 | | 22 | 22 |
| Colloidal silica (Grace Ludox PW-50EC) | 6.6 | | 22.6 | | |
| Magnesium aluminum silicate clay (R T Vanderbilt Veegum Pro) | | | 0.8 | 0.4 | 0.4 |
| 11.6% magnesium acetate tetrahydrate solution | | | 1.4 | | |
| Colloidal silica and Methylcellulose migration | Medium | High | Very Low | High | High |
| Degree of skin staining after washcoat | Low | Very Low | High | Very Low | Very Low |

Figure 4:
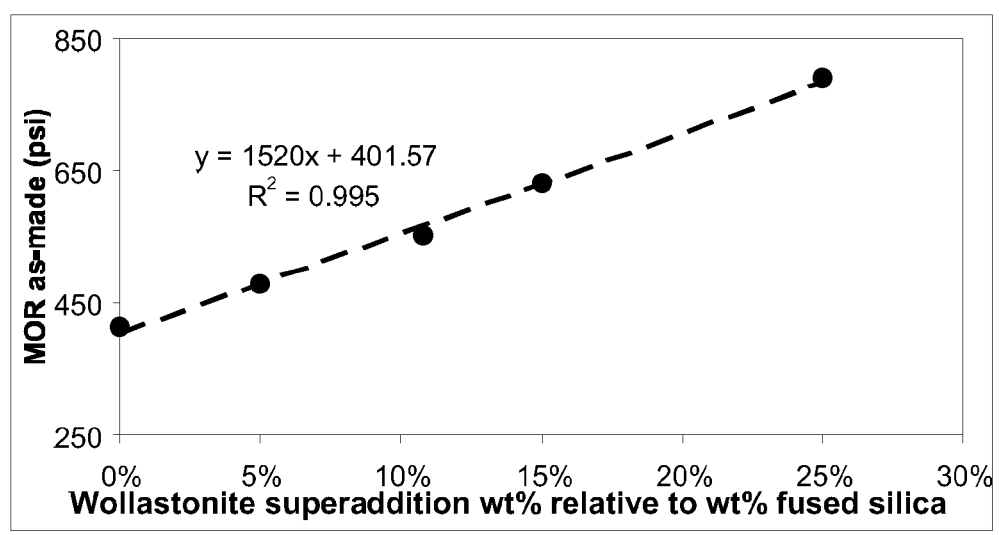
FIG. 4 is a plot of modulus of rupture versus fibrous material super addition (wt %) relative to inorganic filler material (wt %) according to embodiments disclosed herein.

The cement mixtures of Batches 1-10 were mixed with an appropriate amount of water to make a paste, which was subsequently cast into sheets. Modulus of rupture was determined for the cast (uncalcined) sheets in four point flexure according to ASTM C158, Standard Test Methods for Strength of Glass by Flexure (Determination of Modulus of Rupture). FIG. 4 depicts the measured modulus of rupture (MOR) for Batches 1-4. The MOR of Batches 5-10 was found to be similar to the MOR of Batches 1-4, for example, Batches 9 and 10 have uncalcined MOR of 550 and 600 psi, respectively.

In certain exemplary embodiments, the cement mixture has an uncalcined modulus of rupture of at least 500 psi, such as at least 550 psi, and further such as at least 600 psi, and still further such as at least 650 psi, and yet still further such as at least 700 psi, and even yet still further such as at least 750 psi.

In certain exemplary embodiments, the cement mixture has an uncalcined modulus of rupture of at least 500 psi while the crystalline inorganic fibrous material comprises less than 20% of the total weight of the inorganic solids components of the cement mixture. In certain exemplary embodiments, the cement mixture has an uncalcined modulus of rupture of from 500 to 800 psi while the crystalline inorganic fibrous material comprises from 3% to 20% of the total weight of the inorganic solids components of the cement mixture. In certain exemplary embodiments, the cement mixture has an uncalcined modulus of rupture of from 500 to 800 psi while the crystalline inorganic fibrous material comprises from 5% to 15% of the total weight of the inorganic solids components of the cement mixture.

Cement compositions described herein can exhibit viscosities well suited for forming an external skin over a honeycomb body. For example, compositions according to the embodiments herein can have an infinite shear viscosity equal to or less than about 12 Pascal-seconds (Pa·s.), equal to or less than about 5 Pa·s., or equal to or less than about 4 Pa·s. For a shear rate of $10\ s^{-1}$, the shear viscosity may, for example, be equal to or less than about 400 Pa·s, equal to or less than about 350 Pa·s or less than or equal to about 300 Pa·s. Viscosity was measured using a parallel plate viscometer.

Calcining of cement compositions disclosed herein can be conducted in a box furnace with a linear ramp to 600° C. in 3 hours, followed by a hold for 3 hours at 600° C., then followed by a ramp down to room temperature over a time period of 3 hours. In commercial use, the ceramic article would be wash coated with catalyst followed by a heat treatment to remove organic materials. The ceramic article would also be canned with a mat material that may also require heat treatment to remove organic materials. The calcining process simulates service conditions experienced by the ceramic article.

Calcined cement compositions described herein can exhibit an elastic modulus equal to or less than about $1\times10^6$, equal to or less than about $7\times10^5$ Pa, equal to or less than about $5\times10^5$ Pa or equal to or less than about $4\times10^5$ Pa. In certain embodiments the elastic modulus is in a range from about $2\times10^5$ Pa to about $6\times10^5$ Pa.

Calcined cement compositions described herein can exhibit an average thermal shock final pass temperature of at least 600° C. using the method described as follows. First, an oven is preheated to a first temperature and stabilized. Then, a room temperature article (i.e. 23° C.), such as a honeycomb body comprising a ceramic skin, such as embodiments thereof described herein, is plunged into the hot oven for 30 minutes. After the 30 minute period, the hot article is removed from the oven and air quenched back to room temperature without forced cooling (e.g. blowing chilled air, etc.). The article is transferred from the hot and cold locations on low thermal mass ceramic setters (1" cubes of cordierite cellular ceramic). The article is inspected for cracks in the skin and honeycomb body using non-destructive methods including visual inspection (aided with 10× magnification), transmitted light and ultrasound pulse-echo. The article is deemed to have failed when a crack is detected in the honeycomb body or cement skin. When an article survives, the oven is set to a higher temperature and the process is repeated. The last temperature passed and 1st temperature failed bracket the performance of the article. In the case of the data presented herein, the 1st temperature is 500° C. and each successive step is an addition of 50° C. The last temperature survived is reported. No temperatures in excess of 1100° C. are used.

Accordingly, in certain embodiments, the calcined cement skin of the ceramic structure exhibited no visible cracks under 10× magnification after heating to a temperature of 600° C. for 30 minutes followed by unforced cooling to 23° C. In certain other embodiments, the calcined cement skin of the ceramic structure exhibited no visible cracks under 10× magnification after heating to a temperature of 1000° C. for 30 minutes followed by unforced cooling to 23° C.

These dried artificial skins are generally porous and can wick washcoating solution from the washcoating slurry into the skin during washcoating application and drying. Exemplary embodiments of this disclosure provide a skin that is bleedthrough resistant and simultaneously has considerable rheological and process stability. Exemplary embodiments of this disclosure relate to cement batch compositions and methods to prevent washcoating bleedthrough and commensurate staining of artificial skin during the catalyst application process utilizing skin compositions that limit skin wetting during washcoating through migration of skin composition components into the substrate during skin application. Washcoating bleedthrough can result in staining of the skin surface potentially impacting the readability of identification marking, such as barcodes, applied to track the product, loss of platinum group metal (PGM) to the skin surface where there is little effective catalyst activity, or limit the range of washcoating chemistries in cases where skin/washcoat interaction could occur. To overcome this bleedthrough effect, an option may be to treat the skin with a hydrophobic material to prevent washcoat wicking or in cases to assure barcode readability to utilize a primer patch that prevents bleedthrough and assures barcode readability. These approaches can be effective. However, in the case of the hydrophobic treatment of the skin, bleedthrough may be prevented, but interaction between the hydrophobic treatment material and the washcoating may need to be considered. A primer patch may provide barcode readability, but may not significantly reduce the loss of PGM to the low catalyst activity skin.

Exemplary embodiments of this disclosure provide components in the skin cement to generate a barrier (barrier layer) to washcoat entering into and bleeding through the applied skin. For example, this disclosure uses the migration of colloidal silica and methylcellulose into the substrate during the skin application process to prevent staining during the subsequent washcoating process by inhibiting water and dissolved ions from being transported to the outer skin surface. The degree of migration of colloidal silica and methylcellulose that occurs can be impacted by the viscosity of skin cement liquid/colloid components, for example, water, colloidal silica, methylcellulose, etc., and the permeability of the cement filler and grog components during skin application. The inventors have discovered that generally, the greater the degree of migration of the skin cement liquid/colloid components during the skin application process, the less bleedthrough during the washcoating process.

An additional aspect to the skin cement mixtures according to this disclosure relates to the rheological or process stability of the skin cement. The same characteristic that enable bleedthrough protection during washcoating (e.g., migration of methylcellulose and colloidal silica into the substrate during skinning) can negatively impact skin processibility due to high slip casting and syneresis rates during skin cement processing and application. In order to limit this effect inorganic processing agents (thickeners) such as a hydrated magnesium aluminum silicate for example Veegum Pro® or the superaddition of an alternative colloidal silica for example Ludox® PW50EC in combination with methylcellulose can be used to modify the liquid component viscosity and slip cast rate during skin application while still resulting in a stain resistant skin. The inorganic processing agent can act as a thickener to the batch. Such inorganic thickeners include hydrated magnesium aluminum silicate clays such as Veegum®, alkali alumino silicate clays, Bentonite, Smectite, Muscovite, silica, for example, Cabosil®, porous silica gel, for example, Daraclar®, and the like, or combinations thereof.

Ludox® PW50EC, a polydisperse colloidal silica, has a much broader particle size range than the small silica particle size of Ludox® HS-40. Ludox® PW50EC has a particle size range $D_{50}$ of approximately 10-100 nm particle size distribution (PSD) as compared to about 12 nm $D_{50}$ in Ludox® HS-40. In theory, the larger particles of Ludox® PW50EC do not migrate as easily leaving them dispersed and in the bulk cement mixture. The smallest of the particles in the Ludox® PW50EC are still able to migrate and migrate into the substrate.

According to these exemplary embodiments, the skin cement mixtures can be modified to control the level of cement liquid/colloid components, for example water, colloidal silica, and methylcellulose, that migrate into the substrate during the skin application process. This can impact the properties of the skin as well as impact the level of skin wetting and staining during the washcoating process. FIG. 5A shows a schematic of the dynamics of interaction of the skin with the substrate during the skin application process and FIG. 5B shows a schematic of interaction of washcoat slurry with the substrate and skin during the washcoating process. The interaction of skin cement and the contoured substrate can result in generating a skin, skin/substrate, or substrate interface microstructure that can impact washcoat staining performance during washcoating.

Figure 6:
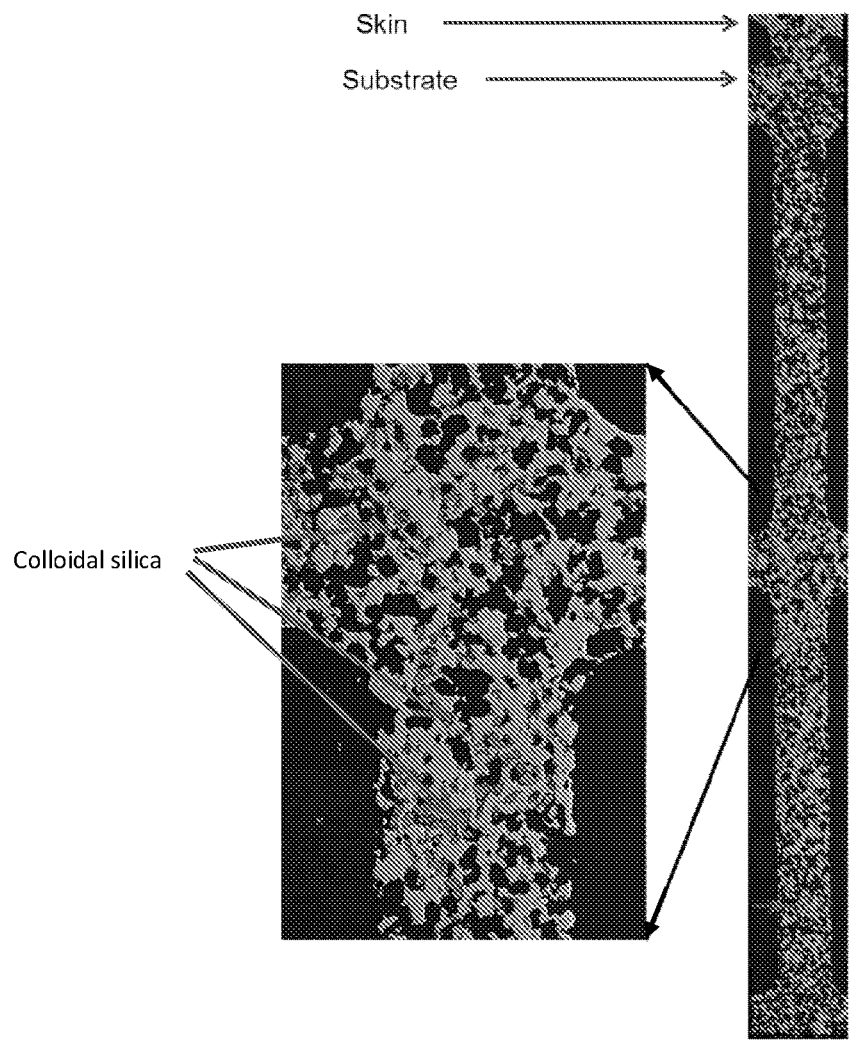
FIG. 6 is an SEM cross-section through substrate and skin showing level of colloidal silica migration into the substrate for cement mixtures of Batches 1-4 in Table 1. A high level of migration is seen for cement mixtures of Batches 1-4. The level of colloidal silica migration also represents the level of migration of other liquid phase components including water and dissolved methylcellulose.

The degree of migration of the liquid and colloidal components into the cordierite substrate from the skin cement during skin application can be observed based on the location of colloidal silica in the substrate from scanning electron microscopy (SEM) images. FIG. 6 is an SEM cross-section through substrate and skin showing level of colloidal silica migration into the substrate for cement mixtures of Batches 1-4 in Table 1. A high level of migration is seen for cement mixtures of Batches 1-4. The level of colloidal silica migration also represents the level of migration of other liquid phase components including water and methylcellulose.

Figure 7:
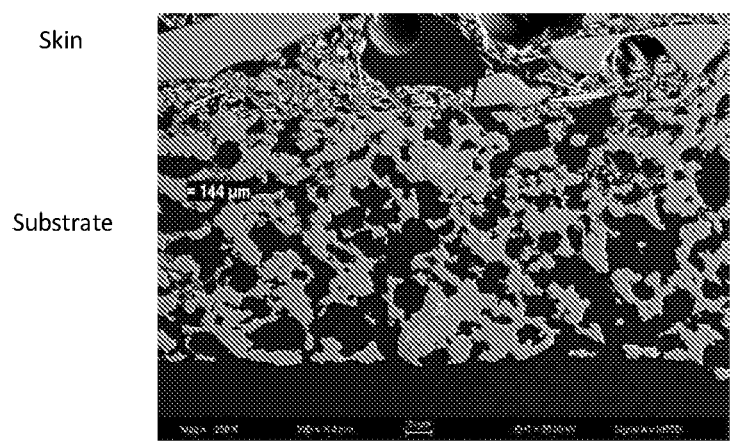
FIG. 7 is an SEM cross-section through substrate and skin showing level of colloidal silica migration into the substrate for cement mixture of Batch 5 in Table 1. A low level of colloidal silica migration is seen for cement mixture of Batch 5.

FIG. 7 is an SEM cross-section through substrate and skin showing level of colloidal silica migration into the substrate for cement mixture of Batch 5 in Table 1. A low level of colloidal silica migration is seen for cement mixture of Batch 5.

Figure 8:
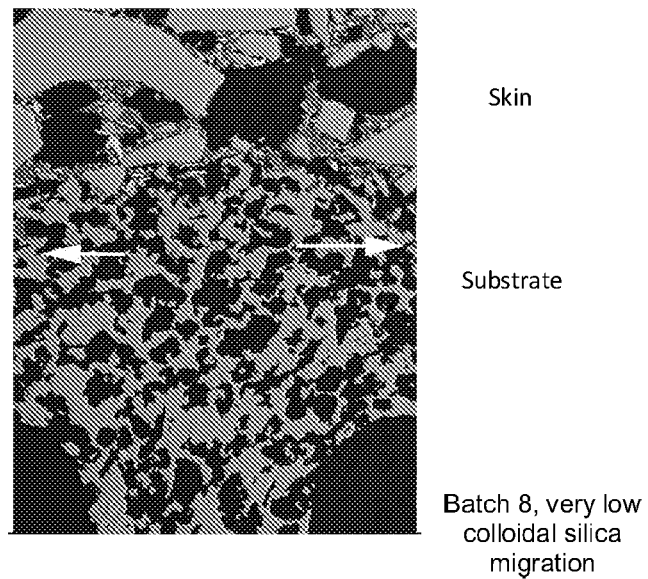
FIG. 8 is an SEM cross-section through substrate and skin showing level of colloidal silica migration into the substrate for cement mixture of Batch 8 in Table 1. A very low level of colloidal silica migration is seen for cement mixture of Batch 8.

FIG. 8 is an SEM cross-section through substrate and skin showing level of colloidal silica migration into the substrate for cement mixture of Batch 8 in Table 1. A very low level of colloidal silica migration is seen for cement mixture of Batch 8.

The degree of migration of methylcellulose and colloidal silica during skin application that occurs can be impacted by a number of factors including the viscosity of skin cement liquid and colloidal components (for example, water, colloidal silica, methylcellulose, etc.), the permeability of the cement filler and grog components, and the pore structure of the substrate being skinned.

Figure 9:
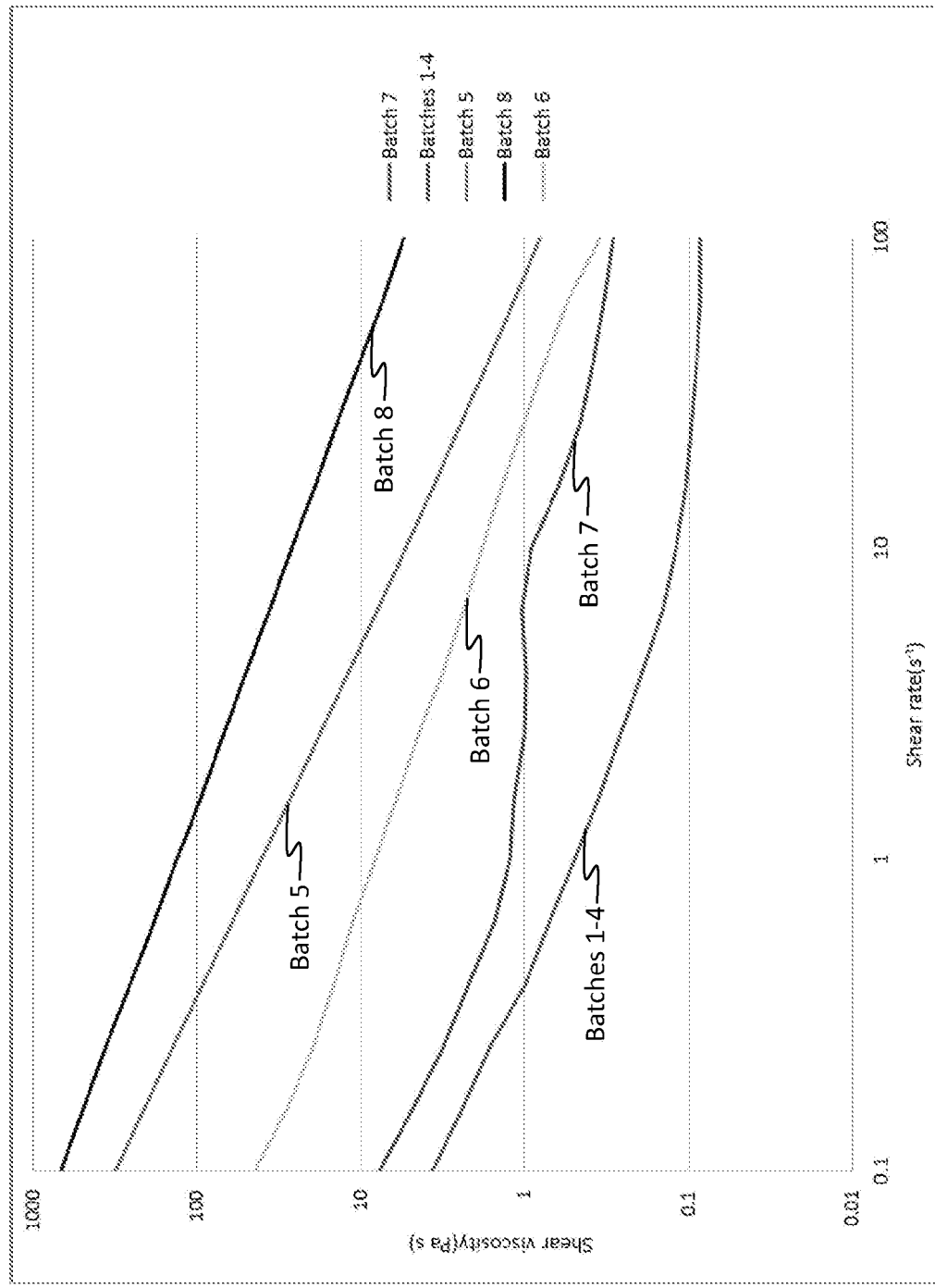
FIG. 9 is a plot of viscosity curves for cement mixtures of Batches 1-4, 5, 6, 7, and 8 in Table 1. The lower viscosity liquid systems result in greater migration of liquid/colloid components including, for example, colloidal silica and methylcellulose during skinning. This results in less bleedthrough of skin surface during washcoating or CuAc surrogate testing discovered through copper acetate (CuAc) surrogate staining tests.

FIG. 9 is a plot of viscosity curves for cement mixtures of Batches 1-4, 5, 6, 7, and 8 in Table 1. The lower viscosity liquid/colloid systems result in greater migration of liquid/colloid components including, for example, colloidal silica and methylcellulose during skinning. These result in less bleedthrough of skin surface during washcoating or CuAc surrogate testing discovered through copper acetate (CuAc) surrogate staining tests.

The level of migration of liquid and colloidal components during skin application is impacted by the viscosity of the liquid and colloid system as shown in the viscosity of the liquids and colloids contained in the example batches. In general, the lower the viscosity, the greater the level of liquid and colloidal component migration. At a shear rate of $1\text{-s}^{-1}$ the liquid and colloid viscosity would preferably be less than 100 (Pa s), more preferably less than 10 (Pa s).

Migration of colloidal silica and methylcellulose into the substrate sets up a barrier (barrier layer) limiting the rate of skin wetting during washcoating. To evaluate this impact 2" skinned substrates were coated using a waterfall process with a copper acetate (CuAc) solution, an air knife was used to remove excess liquid from the channels and the part oven dried up to 100° C. This process was used to mimic the process used that would deposit washcoating components including dissolved PGM salts used in washcoating.

Figure 10A:
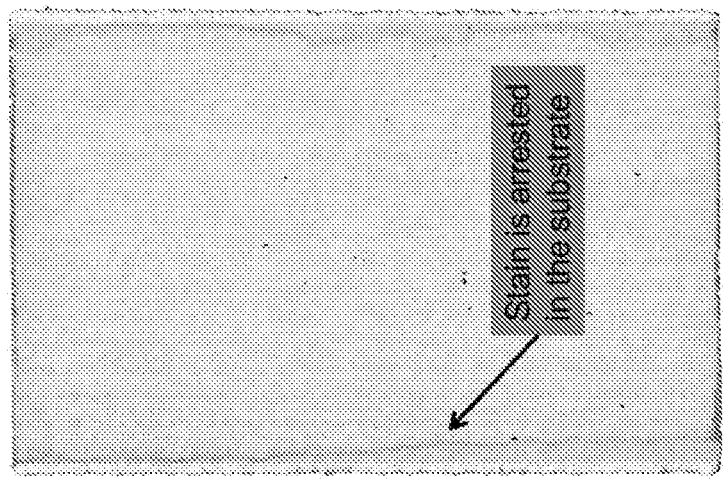
FIGS. 10A and 10B show barrier effect using copper acetate (CuAc) solution as a washcoating surrogate for stain testing on a 2" skinned substrate. Concentration of green (grey in FIGS. 10A and 10B) shows areas where CuAc is concentrated due to prevention of CuAc movement into and through the skin during washcoating.
Figure 10B:
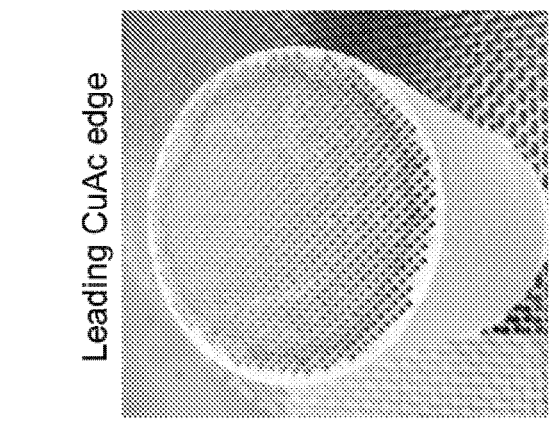

The effect of a methylcellulose and colloidal silica barrier are shown in FIGS. 10A and 10B with concentration of blue green (grey in FIGS. 10A and 10B) stain showing areas where CuAc is concentrated due to prevention of CuAc solution movement into and through the skin during washcoating.

Figure 11:
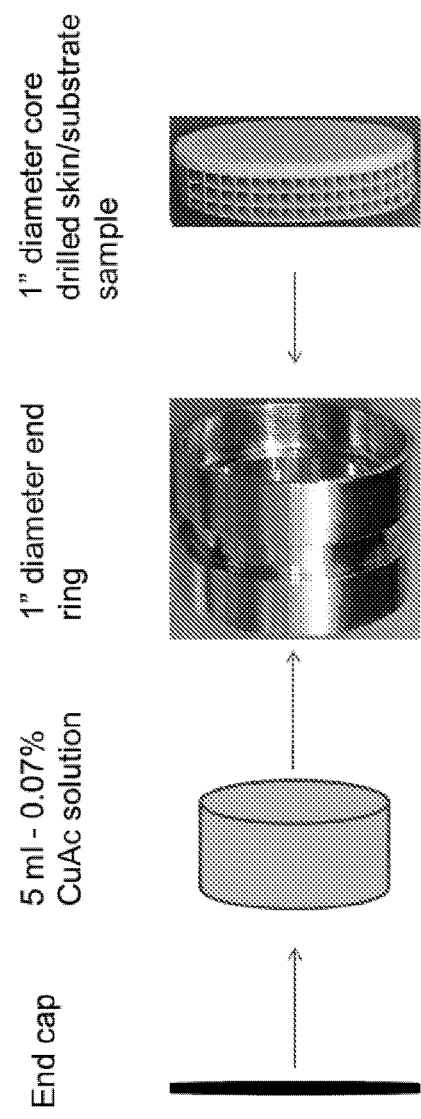
FIG. 11 is a composite schematic with images showing the experimental set up design of a washcoat stain surrogate test sample configuration. Skin samples cast on substrates were cored and sealed in a steel ring. CuAc solution was added on the substrate side and the level of bleedthrough was examined through cross-sections.

An alternative washcoat stain surrogate test sample configuration involves a skin sample cast on a substrate then cored out and sealed in a steel ring as shown in FIG. 11. CuAc solution was added on the substrate side and the level of staining was examined through cross-sections. Generally skin cement mixtures containing lower viscosity liquid and colloid systems showed the least amount of migration of CuAc staining agent to the skin surface.

Figure 12:
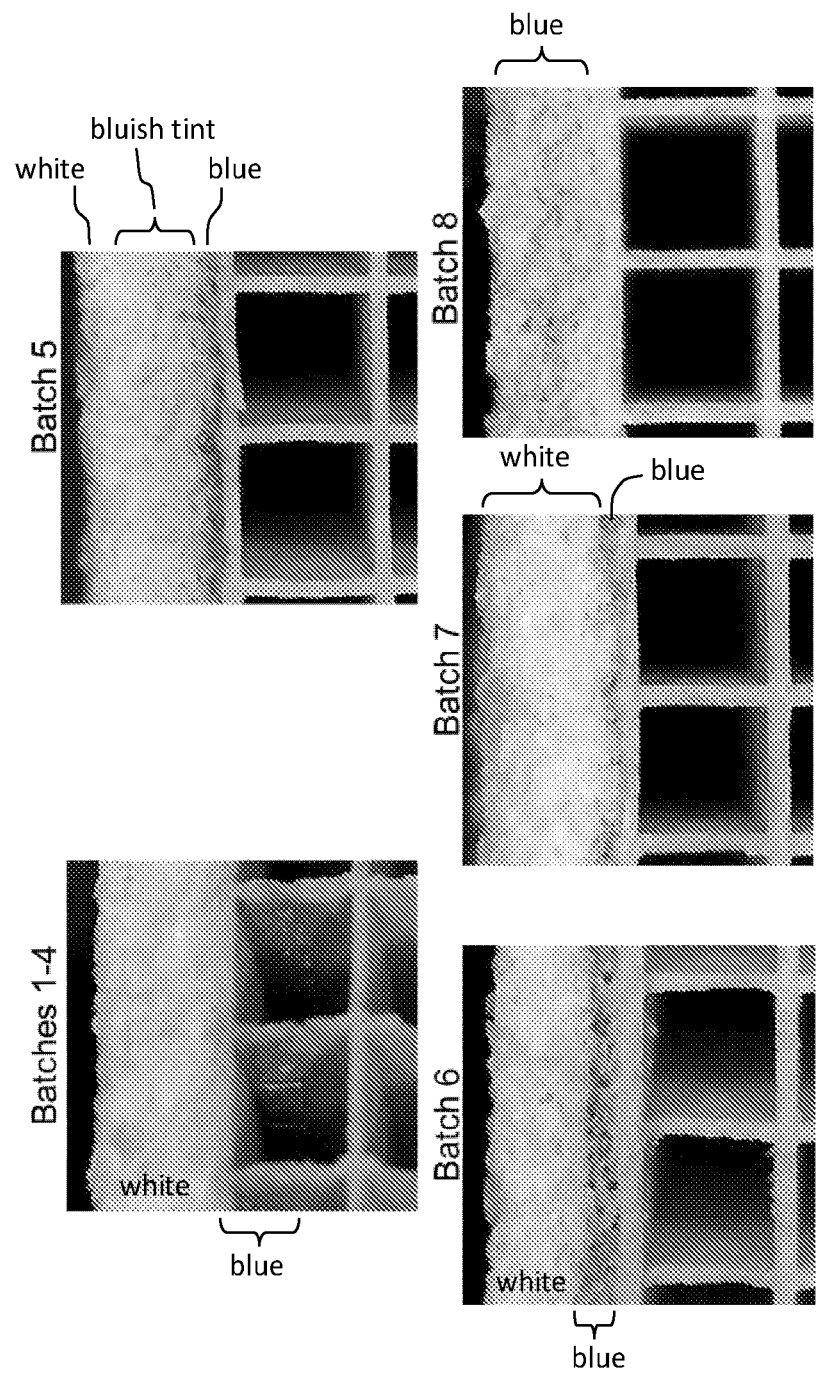
FIG. 12 show experimental results for CuAc staining test for cement mixtures of Batches 1-4, 5, 6, 7, and 8 in Table 1. The lower viscosity liquid/colloid systems result in greater migration of liquid/colloid components including, for example, colloidal silica and methylcellulose during skinning. This results in less bleedthrough of skin surface during washcoating or CuAc surrogate testing discovered through copper acetate (CuAc) surrogate staining tests.
Figure 13:
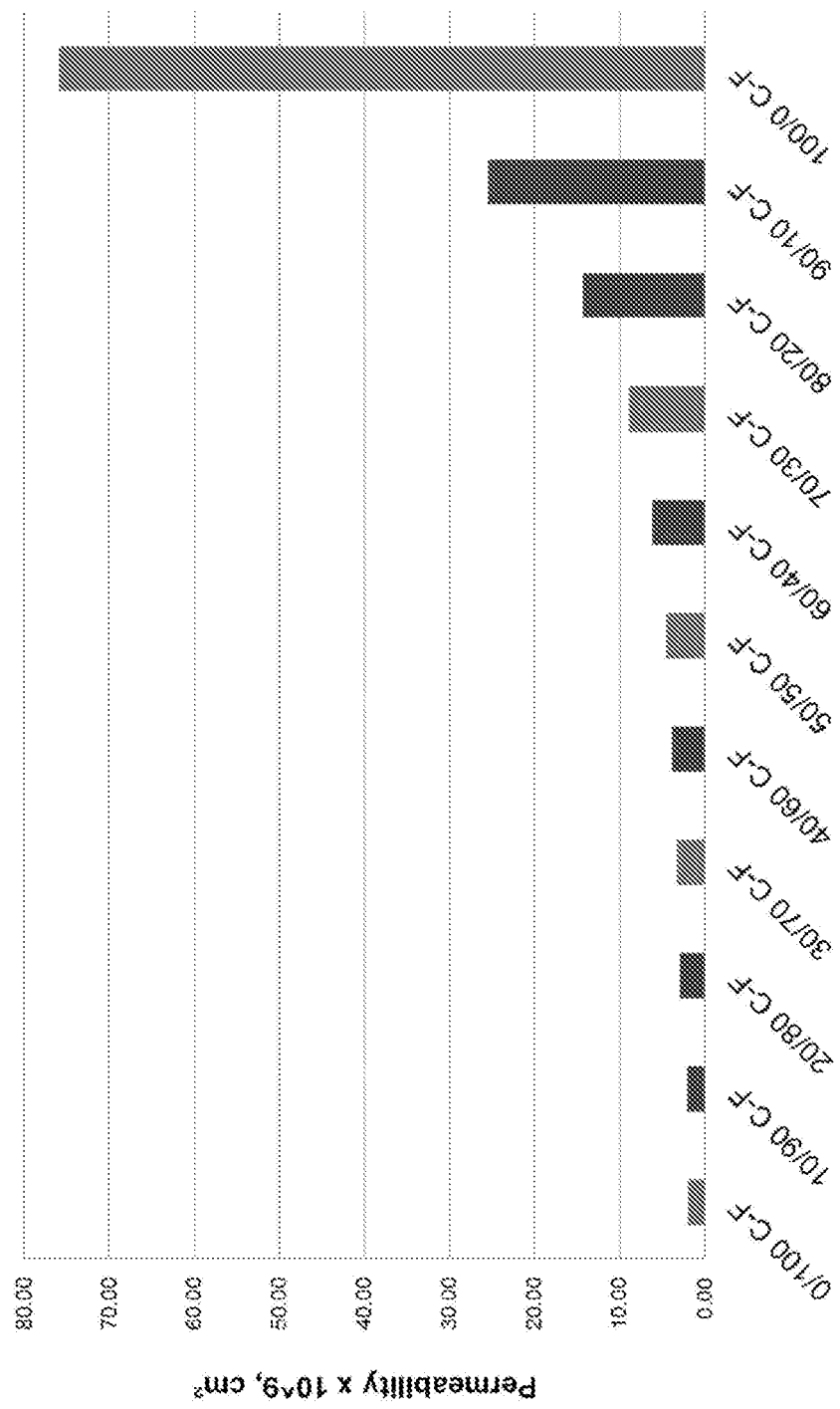
FIG. 13 is a plot showing the impact of coarse to fine fused silica ratio on powder permeabilties. The highest permeabilties are seen for highest coarse fractions.

FIG. 12 show experimental results for cement mixtures of Batches 1-4, 5, 6, 7, and 8 in Table 1. The lower viscosity liquid/colloid systems result in greater migration of liquid components including, for example, colloidal silica and methylcellulose during skinning. This results in less bleedthrough of skin surface during washcoating or CuAc surrogate testing discovered through copper acetate (CuAc) surrogate staining tests.

According to exemplary embodiments, skin cement mixtures disclosed herein are advantageous to prevent bleedthrough of washcoat PGM components into and through the skin, for example, assuring barcode readability and conservation of PGM. According to exemplary embodiments, advantages of skin cement mixtures disclosed herein include a barrier layer established by migrated colloidal silica and methylcellulose that prevents or limits the skin and washcoat interactions, allowing a broader range of washcoat chemistries to be utilized and reducing the risk of undesired skin-washcoat interactions. Advantages include control of the level of skin saturation up to and including complete skin saturation, allowing, for example, protecting the skin from other fluids in processing or use including but not limited to acids, bases, oil, fuel, etc. More uniform skin color after calcination, and brighter, whiter surface, beneficial for bar code readability, are further example advantages of the skin cement mixtures according to exemplary embodiments of the disclosure.

While the cement mixture compositions disclosed herein have been described for skin applications, it is contemplated that they may be used for other applications relating to honeycomb bodies and ceramic particulate filters including for plugging at least some of the ends of the channels of the honeycomb bodies or for adhering segments of honeycomb bodies together.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of making a honeycomb structure comprising:
   coating a periphery of a honeycomb body with a cement mixture, the honeycomb body comprising intersecting porous walls, and the cement mixture comprising an inorganic filler material and a liquid and colloidal system, the liquid and colloidal system comprising an organic binder, an inorganic binder, and a liquid vehicle, and the system of liquid and colloidal components having a shear viscosity of less than 10 pascal-seconds at a shear rate of $1\ \text{s}^{-1}$;
   allowing liquid and colloidal components of the liquid and colloidal system of the cement mixture to migrate into the intersecting porous walls of the honeycomb body adjacent to the cement mixture coated on the periphery of the honeycomb body; and
   drying the cement mixture to form a skin, the skin comprising a barrier formed from the colloidal components of the cement mixture.

2. The method of claim 1 wherein, prior to the coating, at least some of the intersecting porous walls are exposed around the periphery of the honeycomb body.

3. The method of claim 1, wherein the cement mixture further comprises an inorganic thickener, wherein the inorganic thickener comprises at least one of a hydrated magnesium aluminum silicate, alkali alumino silicate, Bentonite, Smectite, Muscovite, silica, and porous silica gel.

4. The method of claim 1 further comprising calcining the skin, wherein the colloidal components of the liquid and colloidal system comprise colloidal silica, and the colloidal silica remains in the intersecting porous walls to form the barrier.

5. The method of claim 1, wherein the honeycomb body comprises a plurality of cells extending axially between first and second opposing end faces of the honeycomb body, defined by the intersecting porous walls, the method further comprising applying a washcoat slurry comprising a catalyst to the porous walls of the honeycomb body and preventing bleedthrough the catalyst to an outer surface of the skin with the barrier.

6. The method of claim 5, wherein the catalyst comprises a platinum group metal.

* * * * *